United States Patent Office 2,932,621
Patented Apr. 12, 1960

2,932,621

PREPARATION OF POLYURETHANE FOAM UTILIZING A SALT OF DIMETHYLETHANOLAMINE AND A DICARBOXYLIC ACID AS A CATALYST

Samuel M. Terry, Pittsburgh, Pa., assignor to Pittsburgh Plate Glass Company, a corporation of Pennsylvania No Drawing. Application February 7, 1956
Serial No. 563,845

4 Claims. (Cl. 260—2.5)

This invention relates to catalysts of interpolymerization of compounds containing a plurality of hydroxyls and compounds containing a plurality of isocyanate groups to form polyurethane resins and it has particular relation to catalysts designed for use in the preparation of foamed polyurethane resins.

It has heretofore been recognized that valuable resins could be formed by reaction of compounds containing a plurality of hydroxyls and compounds containing a plurality of isocyanate groups. The reaction involves linkages of the compounds to provide so-called polyurethanes. If the reaction is conducted in the presence of water, large amounts of carbon dioxide gas are also liberated and under proper conditions are entrapped as bubbles in the mixture to provide foams. Ultimately, the resin becomes completely set to give the foam permanency.

A great deal of study has been devoted to the reactions and numerous articles and patents relating thereto have been published. The following are regarded as being typical articles:

(a) An article by Bayer et al., in "Rubber Chemistry and Technology," volume 23, pages 812–835.

(b) An article by A. T. Stephenson, "Rubber Age," volume 77, number 1, pages 63–68.

(c) An article in "Fortune," March 1955, pages 110–113 and pages 166 and 169.

Patents which also disclose similar types of resins include the following:

| | |
|---|---|
| 2,634,244 | 2,642,403 |
| 2,620,349 | 2,676,157 |
| 2,577,280 | 2,591,884 |
| 2,698,838 | 2,577,281 | and others.

The foregoing reactions are usually conducted in the presence of a catalytic agent such as a tertiary amine, e.g. N-methyl or N-ethyl morpholine, dimethyl ethanolamine, or the like. It is a characteristic of the reactions that where the tertiary amines are used as catalysts, they take place very rapidly and within a few minutes, or even within a matter of seconds, the mixture will foam and at least start to set to a solid, thermoset state. This is often advantageous if the mixture is formed in desired final position, or can be so disposed at once (as for example in a continuous mixing operation where the mixture is formed in, or transferred very quickly after formation), e.g., in a continuous operation upon a surface or in a mold designed to contain the mixture during the reaction and to give the product desired shape, or when the mixture is spread upon a surface to be coated. However, it often presents a problem during the preliminary operations of forming and handling the mixtures before they are in final position. This is true because the mixture may foam and set to an undesirable extent while the mixing operation is still in progress or before the material can be poured or otherwise introduced into its final position. As a result, the mixing and handling apparatus may be fouled up by preset material and the walls of the cells which are prematurely formed may tend to break down to liberate gases or to form voids during the subsequent operations. These difficulties are particularly pronounced in those cases in which it is desirable to premix the hydroxy-containing compound and the isocyanate-containing compound in substantial quantities in a batch operation. Before the batches can be formulated and the liquid mixture transferred to a mold or spread in final position, the reaction may have progressed so far that the properties of the final product are adversely affected by the handling operations.

In accordance with the provisions of the present invention, the foregoing difficulties are obviated by provision of a catalyst for the foregoing foaming and setting reactions between polyhydric compounds and polyisocyanates, which does not become effective until a substantial period of time has elapsed, thus permitting the proper mixing and handling of the several components without danger of premature foaming and setting, but after a proper lapse of time, the catalyst becomes fully effective to promote the ultimate reactions involved in the liberation of gases and the thermosetting of the mixture.

More specifically, the present invention involves the discovery that the amine salts of dicarboxylic acids and notably of oxalic acid and more particularly the salts of oxalic acid and those tertiary amines containing hydroxyl groups attached to carbon atoms, constitute valuable delayed action catalysts which in the liquid mixtures do not become effective immediately, but after an appropriate lapse of time following introduction into the mixture, they do become fully effective and cause the reaction to proceed to completion smoothly, rapidly and efficiently. By use of these delayed action catalysts, time is afforded for complete and thorough commingling and manipulation of the compound containing plural hydroxyls, water and the compound containing plural isocyanate groups before substantial onset of reactions of foaming and setting. Batches of the foamable mixture can thus be stirred together with the deliberation desirable for uniform distribution and the mixture can be spread, poured, sprayed or otherwise handled without damage to the cell structure.

In the practice of this invention, various compounds containing a plurality of hydroxyls are contemplated as being within the scope of the invention. Numerous polyhydric compounds are recognized in the prior art. They include glycerol, glycols, such as polyethylene glycol, castor oil and other bodies. However, it is deemed that polyester products containing available hydroxyls and being obtained by reacting di- or polyhydric alcohols with dicarboxylic acids are particularly useful in the practice of the invention. These polyesters, as will be recognized, may readily be prepared by reaction of a dicarboxylic acid, such as dimer acids, succinic acid, adipic acid or other open chain aliphatic dicarboxylic acids, or aryl dicarboxylic acids, such as phthalic acid, and alcohols, such as glycol, diethylene glycol, propylene glycol or the like, or preferably mixtures of such dihydric alcohols with such polyhydric alcohols as glycerol or the like containing at least three available hydroxyls. Still other polyhydric alcohols useful as polyhydric components in forming the polyesters include hexanetriol, pentaerythritol, trimethylol ethane, trimethylol propane, mannitol, and the like. In the preparation of the more flexible foams, the proportion of the polyhydric alcohol component to dihydric component is usually relatively low, but in more rigid foams, the ratio of the polyhydric alcohol component may be increased. Usually, the combined alcohols are in substantial excess, e.g. 5 to 200 percent excess over the total of the carboxyls available in the reaction mixture from which the polyester is derived. The hydroxyl value of the polyester may be in a range of about 40 to 600. The acid value preferably is low, e.g. below 20 and it may be 1 or even lower.

The preparation of the polyester component is normally conducted in accordance with conventional procedures employed in the preparation of alkyd resins and may comprise, for example, refluxing a mixture of the alcohol component or components and the dicarboxylic acid component or components in a solvent such as xylene in order to evolve and to remove water. The water may be separated from the system azeotropically. The reaction is continued until the desired viscosity and acid number are attained.

Isocyanates which may be interacted with polyhydric compounds, such as the polyesters above briefly described, may include those commonly recognized to be useful in the preparation of cross-linked polyurethane compounds and include:

Chlorophenyl 2,4-diisocyanate
p-Phenylene diisocyanate
Tolylene diisocyanate (as mixed isomers)
Diphenylmethane 4,4'-diisocyanate
Hexamethylene diisocyanate, and others In preparing the cross-linked and foamed polyurethane resins in accordance with the provisions of the present invention, the tolylene diisocyanates and particularly 2,4-tolylene diisocyanate, or mixtures thereof with 2,6-tolylene diisocyanate are deemed to be particularly satisfactory. Mixtures of the two isomers containing from about 65 or 70 percent to 90 or 95 percent of the 2,4-isomer operate very satisfactorily. Commercial mixtures, such as those sold as Mondur-TD or Hylene-TM, when mixed with polyhydric compounds, such as the polyesters herein disclosed and catalyzed with an aqueous solution of salts of oxalic acid and tertiary amines produce excellent foams.

The salts of oxalic acid, which may be incorporated with mixtures of the isocyanates and the polyhydric compound in accordance with this invention, are water-soluble and preferably comprise tertiary amines containing 1 or more hydroxyls attached to a carbon atom of the amine compound. Tertiary amines which in free state constitute catalysts of the reaction are to be preferred. The alkyl morpholines, such as N-methyl morpholine or N-ethyl morpholine, constitute examples of such tertiary amines. Other amines containing 3 organic groups substituted for hydrogen in the nitrogen include alkaloids such as pelletierine and the like. Those tertiary amines in which the organic group attached to ammonium nitrogen contain 1 or more hydroxyls attached to a carbon atom to provide the group:

are especially desirable because the hydroxyls react at least to a substantial degree with isocyanate groups thereby binding the catalyst salt of the amine in the cross-linked polyurethane molecules. Pelletierine, above referred to, constitutes an example of such amine containing a hydroxyl group. Still other amines which also include the hydroxyl groups and which are readily available commercially comprise dimethyl ethanolamine and similar triamines containing a hydroxyl group attached to a carbon atom. The acid component of the delayed action catalyst is polycarboxylic and may include such acids as:

| Oxalic | Malonic |
|---|---|
| Succinic | Adipic |
| Malic | Tartaric |

Acids which under conditions involved in foaming and setting of the polyester-diisocyanate mixtures decompose to liberate carbon dioxide, thus removing the acid from the system are particularly good. Oxalic acid is outstanding in this respect. The salt apparently first splits to liberate the acid and the amine. The amine promotes the reaction of the polyhydric compound and the isocyanate and the oxalic acid decomposes to liberate carbon dioxide. The carbon dioxide is thus added to that liberated from the reaction of the isocyanate component.

Usually the tertiary amine is employed in excess of stoichiometric ratio with respect to oxalic acid so that the salt usually is basic and may have a pH value of 8 to 10 or 11. A pH of about 9 is quite satisfactory.

The amines and the oxalic acid react quite readily to form the catalytic salts of this invention. For example, the acid crystals may be dissolved directly in anhydrous dimethyl ethanolamine.

The salts may be added to the polyhydric component of the foamable mixture as aqueous solutions. The water may be all of that required in the mixture of polyhydric compound and isocyanate compound to produce foam; or if preferred it can be incorporated into a part only of the total water or may even be added separately from the water component.

For purposes of promoting the incorporation of the water, or aqueous solution of catalyst into the polyhydric component, an emulsifying agent (or wetting agent) such as one of the well known commercial emulsifiers may be employed. Appropriate emulsifiers comprise such compounds as an alkylated phenoxy polyethoxy ethanol of the structure:

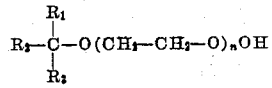

where $R_1$, $R_2$ and $R_3$ are of the class comprising —H, —$CH_3$, —$C_2H_5$ and the like and $n$ may vary from 2 through 6. Commercial surfactants comprise: Emcol-H-77 which is sold by the Emulsol Corporation; and is a balanced blend of higher carboxylic acid esters of polyoxyethylene and polyhydric alcohol and of partially sulfonated alkyl and aryl derivatives. Other emulsifying agents comprise Emulphor-ELA, which is a condensation product of ethylene oxide and fatty acids free of soap; Tween-40, which is polyoxyethylene sorbitan monopalmitate; Tween-60, which is polyoxyethylene sorbitan monostearate; Witco-7786, which is similar to Emcol-H-77 and other recognized emulsifying agents typified by the foregoing examples. These are usually added to the polyester-aqueous catalyst solution to promote emulsion.

In making up the foamable mixtures, the proportion of the several ingredients will vary substantially, dependent upon the flexibility, the density and other properties desired in the foamed and cross-linked polyurethane resin product. The following are suggested as representing typical ranges of proportions:

| | Parts by weight |
|---|---|
| Polyester | 100 |
| Emulsifier | 0.1–10 |
| Water | 0.1–5 |
| Catalyst which is a salt of oxalic acid and a tertiary amine | 0.2–5 |

This mixture is a separate package termed package A. The diisocyanate is added as component or package B in an amount of 20 to 100 parts by weight.

In making up the mixtures, the water containing the dissolved salts of oxalic acid and a tertiary amine in proper proportions may be incorporated with the polyester in the presence of the emulsifying agents. The resultant emulsion of polyester, water and catalyst salt as component A of the foamable mixture, preferably is maintained separate from the diisocyanate (component B) until shortly before the mixture is to be foamed and cross-linked. It is an advantage of the foregoing mixture of polyester, water, emulsifying agent and catalyst where the catalyst is a salt of oxalic acid and a tertiary amine or at least comprises such salt in admixture with tertiary amine, that the diisocyanate can be added a substantial period, e.g. several minutes, before the mixture is to be foamed and thermosetting and cross-linking are retarded or at least do not immediately begin to occur to an advanced degree. Adequate time for complete mixture of the diisocyanates with the other componets is thus afforded even in conventional mixers where the several components are stirred together in a batch operation in an appropriate container. After the mixture has been adequately agitated to obtain uniform distribution, it may be poured, spread or otherwise introduced into molds or applied to surfaces to be coated.

In batch mixes employing conventional catalysts, air is beaten into the system during mixing. Air not only exerts an unfavorable influence on the reactivity of the system, but the resulting foam usually has an extremely fine texture with randomly dispersed holes of varying size to give a Swiss cheese-like appearance. The system employing the delayed action catalyst permits the escape of air before foaming and gelling take place. The resulting foam, therefore, possesses an unusually uniform texture with well defined cell structure and free of the randomly dispersed holes.

It is also within the purview of the invention to prepare so-called prepolymers of the polyhydroxy compound and the isocyanate compounds. These are liquid, unfoamed materials prepared in the absence, or near absence of water and with or without catalyst as may be desired. The prepolymer may comprise the whole of the polyester and the diisocyanate reacted together in the substantial absence of water and being substantially unfoamed and being liquid. This intermediate product is relatively stable. When it is to be employed in forming a foam, it is mixed with water and catalyst, the latter being a salt of a tertiary amine and oxalic acid. It is further within the scope of the invention to form prepolymers which contain but a portion of the polyester of the ultimate foamed and cross-linked product reacted with the whole of the diisocyanate. Approximately ½ of the polyester component may be reserved and is incorporated with the catalyst component, water and emulsifying agent, thus forming an emulsion which can be added as a separate package or component A to the prepolymer which then constitutes component B. The preparation of the latter type of prepolymers of a diisocyanate and a polyester containing hydroxyls and the incorporation of the same with an emulsion of added polyester, water emulsifying agent and catalyst in order to form a mixture capable of foaming and cross-linking are disclosed and claimed in a copending application to Earl E. Parker and Keith H. Coultrap, Serial Number 517,094, filed June 21, 1955. The use of the salts of oxalic acid and tertiary amines as the catalyst component in the reactions disclosed in the foregoing application is contemplated.

When the diisocyanate component is incorporated with the foamable mixture as a prepolymer, the combined amounts of polyester, emulsifying agent and catalyst (oxalic acid salt of a tertiary amine) will fall within the ranges given in the previous table. The total amount of diisocyanate will also be within the ranges specified.

The preparation of polyhydric compounds such as polyesters and the use thereof in preparing cross-linked polyurethane foams will now be illustrated by means of specific examples.

The following constitute polyesters which are valuable for interpolymerization with diisocyanates and which when mixed with the latter agents can be catalyzed with oxalic acid salts in accordance with the provisions of the present invention:

*Example A*

The polyester is of a mixture comprising:

| | Moles |
|---|---|
| Adipic acid | 16 |
| Diethylene glycol | 18 |
| Glycerine | 1 |

The esterification reaction may be promoted by a catalyst, e.g. paratoluene sulphonic acid in an amount of 0.1 percent by weight based upon the mixture. The polyester is prepared by heating the foregoing mixture in accordance with conventional procedure preferably in the presence of an azeotropic solvent, e.g. xylene, to evolve and remove water. The reaction is continued until a hydroxyl value of 60 to 80 is obtained and the acid value is below 12, e.g. 1 or thereabouts. This polyester is of rather low hydroxyl value and is especially suitable for preparation of more flexible foams. In the preparation of rigid type foams, it is usually preferred to employ polyesters of higher hydroxyl value.

*Example B*

The polyester in this example is prepared in a manner similar to that of Example A except that the glycerine is replaced by a mole of trimethylol propane. The diethylene glycol and adipic acid of the former example are retained. This polyhydric alcohol contains only primary hydroxyls and for that reason is sometimes preferred over glycerol.

*Example C*

In ths example, the polyester is prepared by the procedure of Example A except that the diethylene glycol is replaced by a stoichiometric amount of hexanediol.

It is to be understood that the oxalic acid salts of tertiary amines may also be employed as catalysts in the preparation of rigid type resins:

*Example D*

The resinifiable mixture in this example comprises:

| | Moles |
|---|---|
| Phthalic anhydride | 2 |
| Adipic acid | 2 |
| Trimethylol propane | 20 |

The mixture preferably is cooked to an acid value of about 1 and a hydroxyl value of about 450. The resin is liquid and the high hydroxyl value renders it especially useful in forming rigid foams. The polyester may be mixed with an emulsifier, water and catalyst (namely, oxalic acid salts of tertiary amines) and the mixture allowed to foam and cross-link.

*Example I*

In order to prepare a catalyst solution suitable for catalyzing the reaction of the isocyanate and the polyester in forming polyurethane foams in accordance with the present invention, an aqueous mixture of oxalic acid and a tertiary amine may be formed. A typical mixture is of the following composition:

| | Parts by weight |
|---|---|
| Water | 40.0 |
| Oxalic acid | 30.0 |
| Dimethyl ethanolamine | 48.0 |

The oxalic acid employed in the reaction is the dihydrate and the dimethyl ethanolamine is anhydrous. The solution is preferably of a pH of about 9 and contains an excess of dimethyl ethanolamine. This solution is employed in the tabulations and examples to follow.

The following is illustrative:

| | Parts by weight |
|---|---|
| Polyester (per Example A) | 100 |
| Solution of catalyst (see above) | 3 |
| Emulsifier (Emcol H–77) | 2 |

These several ingredients are formed into an emulsion by agitation.

In order to form a foam, the foregoing mixture as component A is incorporated batchwise by agitation with 25 parts by weight of tolylene diisocyanate isomers comprising 65 parts of 2,4-tolylene diisocyanate and 35 parts of 2,6-tolylene diisocyanate (parts are by weight).

The mixture is stable for several minutes, affording adequate time for thorough mixing, pouring into molds, or spreading upon a surface before the reactions of foaming and setting attain objectionable headway. The mixture will foam and cure if allowed to stand for a sufficient period of time. However, it may also be foamed and cured relatively quickly by heating it to about 220° C. for about 30 minutes. The product is a good foam of uniform fine cell structure having a density of about 4.5 pounds per cubic foot and being quite flexible in nature. The foam is useful as a cushioning medium, as an insulation against the transfer of heat and for most of the various uses to which flexible polyurethane foams have heretofore been put.

*Example II*

In this example, the components are the same as in Example I. However, the tolylene diisocyanate mixed isomers and polyester, in accordance with this example, are preliminarily mixed in the substantial absence of water and with or without catalysts, to provide a liquid, relatively stable prepolymer. The latter may be mixed with the aqueous solution of oxalic acid and dimethyl ethanolamine and in the amounts described in Example I to provide a composition which after appropriate short delay permitting mixing, pouring and other manipulations, foams and sets to provide a polyurethane foam resin of good properties. Curing may be by application of heat, for example about 220° F., or by allowing the mixture to stand for a substantial period of time.

In accordance with the provisions of the following Example III, the diisocyanate component of a polyurethane foam is reacted with a portion only of the polyester component in the substantial absence of water and the mixture is reacted, with or without application of heat, in order to form a liquid prepolymer. The prepolymer may be mixed with added polyester, preferably one which has been preliminarily emulsified with an aqueous solution of the catalyst.

*Example III*

The polyester of this example is the same as that of Example I. The diisocyanate component comprises a commercial product known as Mondur–TD or Hylene–TM–65 and comprising diisocyanate isomers approximately in the proportions previously mentioned in the foregoing Example I. The proportions of the several components of the prepolymer may be as follows:

| | Parts by weight |
|---|---|
| Polyester (as per Example A) | 100 |
| Tolylene diisocyanate isomers | 150 |
| Lauryl alcohol | 2 |
| Tween–40 (commercial surfactant) | 2 |

The mixture may be reacted by heating the same at about 60° C. or thereabouts. Heating is stopped while the mixture is still liquid. The mixture at this stage, does not contain an appreciable amount of water. The prepolymer will stand for a long period of time without substantially thickening or foaming. This prepolymer is used as component B of the foamable mixture.

Component A is made up to comprise:

| | Parts by weight |
|---|---|
| Polyester (as above described) | 100 |
| Aqueous dimethyl ethanolamine salt of oxalic acid | 5 |

In order to form a foamable mixture, components A and B are mixed by agitating a batch thereof.

The mixing may be carried to completion without danger of premature gelation and time is also afforded for pouring the mixture into a mold, spreading, or otherwise manipulating the mixture. After a reasonable delay, permitting the foregoing operation, the mixture starts to foam and cure and within a short time the cure is brought to a conclusion to provide a foam of good structure and other characteristics. Curing may be promoted by heating the mixture to 220° C. or thereabouts, for about 30 minutes.

*Example IV*

Substitute for the polyester of Example I, the polyester of trimethylol propane, diethylene glycol and adipic acid, as disclosed in Example B and proceed as in Example I. In this example, the polyhydric alcohol contains no secondary alcohol groups. This is sometimes advantageous. The foaming and curing of the mixture is promoted by the aqueous solution of the salt of oxalic acid and dimethyl ethanolamine.

*Example V*

In this example, the polyester of Example A is replaced by the polyester of Example D.

The package A is of the following composition:

| | Parts by weight |
|---|---|
| Polyester (as per example D) | 100 |
| Surfactant (Tween–40) | 1.0 |
| Aqueous solution of catalyst (see Example I) | 2 |

This is incorporated with package B which comprises 80 parts by weight of mixed isomers of tolylene diisocyanate as in Example I. The foaming and curing is promoted by heating the mixture to about 220° F. for 30 minutes. This polyester is of relatively high hydroxyl value and is useful in forming more rigid types of foams. The product as obtained by the substitution of the polyester in accordance with this example is useful as heat insulation, for filling airplane propellers and radomes, and for many other applications.

*Example VI*

In this example, catalyst is made up comprising the salt in which 30 parts of oxalic acid containing 2 atoms of water of crystallization is mixed with 48 parts of dimethyl ethanolamine. The resultant salt is employed without further additions of water. However, water is incorporated with the foamable mixture as hereinafter indicated.

Package A of a foamable mixture comprises an emulsion of:

| | Parts by weight |
|---|---|
| Polyester (see Example A) | 100 |
| Catalyst | 2.5 |
| Water | 2 |
| Surfactant Emcol-H-77 | 2 |

The foregoing emulsion is incorporated with a diisocynate mixture comprising:

| | Parts by weight |
|---|---|
| 2,4-tolylene diisocyanate | 28 |
| 2,6-tolylene diisocyanate | 7 | as package B.

The mixture is foamed and cured as in Example I. The product is of a density of 3.6 pounds per cubic foot and is a useful foam for thermal insulation, cushioning and other purposes.

In the embodiments of the invention illustrated by the examples, other compounds containing a plurality of hydroxyls and other compounds containing a plurality of isocyanate groups may be used. Likewise, the emulsifier shown may be replaced by other recognized surfactants. The proportions of the several ingredients are illustrative and are susceptible of variation. The temperatures are also variable. Higher temperatures, of course, increase the rate of reaction. However, they should not be so high as to decompose or to volatilize the reactants.

*Example VII*

An additional example of a foam which may be included here is an extremely low density type which has not been attainable by any other catalyst yet examined. It is formulated as follows:

| | Parts by weight |
|---|---|
| Polyester | 200.0 |
| Wetting agent (Emcol-H-77 or Wittco 77-86) | 7.0 |
| Water | 10.0 |
| Catalyst | 8.0 |
| Tolylene diisocyanate (Hylene TM; ratio of 2,4 to 2,6 isomer, 80:20) | 160.0 |

The polyester has hydroxyl number of 100 to 200.

Catalyst consists of 30 parts oxalic acid crystals dissolved in 48.0 grams dimethyl ethanolamine.

The mixture cures at about 220° F. and the product is a foam of a density in a range of about 1.2 to 1.5 pounds per cubic foot.

The forms of the invention as herein given are to be considered as being by way of example. It will be manifest to those skilled in the art that numerous modifications may be made therein without departure from the spirit of the invention or the scope of the appended claims.

I claim:

1. In a method of forming a foamed, polyurethane resin, the steps of forming a liquid mixture of (A) 100 parts by weight of a polyester of a dicarboxylic acid, a glycol and glycerol, said polyester being of a hydroxyl value in a range of about 40 to about 600; (B) about 20 to 100 parts by weight of tolylene diisocyanate, about 0.1 to 5 parts by weight of water, about 0.2 to 5 parts by weight of polyester of a delayed action catalyst which consists essentially of a salt of oxalic acid and dimethylethanol amine the salt being of a pH value in a range of about 8 to about 11 allowing the mixture to foam and then curing the foam at a temperature of about 220° F.

2. In a method of forming a foamed polyurethane resin, the step of forming a liquid mixture of (A) a polyester of a saturated dicarboxylic acid and a polyhydric alcohol, said polyester being of a hydroxyl value of about 40 to 600 and (B) tolylene diisocyanate (C) water and (D) about 0.2 to about 5 parts by weight per 100 parts by weight of said polyester, of a salt of a dimethyl ethanolamine and oxalic acid said salt being of a pH value of about 8 to 11.

3. In a method of forming a foamed polyurethane resin, the step of forming a liquid mixture of (A) a polyester of adipic acid, diethylene glycol and glycerol, and an acid value of about 1 said polyester being of a hydroxyl value of about 40 to about 600, (B) about 20 to about 100 parts by weight of tolylene diisocyanate, (C) water in an amount of about 0.1 to 5 parts by weight, and (D) a catalyst which consists essentially of a salt of dimethyl ethanolamine and a dicarboxylic acid selected from the class consisting of oxalic acid, succinic acid, malic acid, malonic acid, adipic acid, tartaric acid, said salt being of a pH value of about 8 to about 11, and being employed in an amount of about 0.2 to about 5 parts by weight based upon 100 parts by weight of the polyester.

4. In a method of forming a foamed polyurethane resin, the step of forming a liquid mixture of (A) about 100 parts by weight of a polyester of adipic acid, diethylene glycol and glycerine, said polyester being of a hydroxyl value of about 40 to about 600 and an acid value of about 1; (B) about 20 to about 100 parts by weight of tolylene diisocyanate; (C) about 0.1 to about 3 parts by weight of water; and (D) a delayed action catalyst which consists essentially of a salt of oxalic acid and dimethyl ethanolamine, said salt being of a pH value of about 8 to 11 and being employed in an amount of about 0.2 to about 5 parts by weight based upon the polyester, allowing the mixture to foam and curing the mixture.

References Cited in the file of this patent

UNITED STATES PATENTS

| 2,764,565 | Hoppe et al. | Sept. 25, 1956 |
| 2,779,689 | Reis | Jan. 29, 1957 |
| 2,842,506 | Roussel | July 8, 1958 |

FOREIGN PATENTS

| 1,098,302 | France | Mar. 2, 1955 |
| 1,106,527 | France | July 20, 1955 |